(12) United States Patent
Hamon

(10) Patent No.: US 10,051,310 B2
(45) Date of Patent: Aug. 14, 2018

(54) TERMINAL IDENTIFICATION METHOD IN A SYSTEM FOR PROVIDING MULTIMEDIA CONTENT

(71) Applicant: VIACCESS, Paris la Défense (FR)

(72) Inventor: Vincent Hamon, Rennes (FR)

(73) Assignee: VIACCESS, Paris la Défense (FR)

( * ) Notice: Subject to any disclaimer, the term of this patent is extended or adjusted under 35 U.S.C. 154(b) by 0 days.

(21) Appl. No.: 14/896,715

(22) PCT Filed: Jun. 6, 2014

(86) PCT No.: PCT/EP2014/061918
§ 371 (c)(1),
(2) Date: Dec. 8, 2015

(87) PCT Pub. No.: WO2014/198676
PCT Pub. Date: Dec. 18, 2014

(65) Prior Publication Data
US 2016/0165296 A1  Jun. 9, 2016

(30) Foreign Application Priority Data

Jun. 10, 2013 (FR) ...................... 13 55324

(51) Int. Cl.
*H04N 21/426* (2011.01)
*H04N 21/258* (2011.01)
(Continued)

(52) U.S. Cl.
CPC ..... *H04N 21/42684* (2013.01); *H04N 21/222* (2013.01); *H04N 21/2347* (2013.01);
(Continued)

(58) Field of Classification Search
CPC ....... H04N 21/42684; H04N 21/25816; H04N 21/8358; H04N 21/26606; H04N 21/4181;
(Continued)

(56) References Cited

U.S. PATENT DOCUMENTS

| | | | | |
|---|---|---|---|---|
| 2001/0031066 | A1* | 10/2001 | Meyer | G06T 1/0021 382/100 |
| 2001/0054150 | A1* | 12/2001 | Levy | G06F 21/10 713/176 |
| 2004/0111740 | A1 | 6/2004 | Seok | |
| 2005/0169467 | A1* | 8/2005 | Risan | G11B 20/00086 380/201 |

(Continued)

*Primary Examiner* — Pinkal R Chokshi
(74) *Attorney, Agent, or Firm* — Occhiuti & Rohlicek LLP

(57) ABSTRACT

A terminal identification method which acquires then decodes multimedia temporal content to generate a multimedia stream in unscrambled form with at least one temporal succession of time intervals. A set of information bits for displaying an image or playing a sound being transmitted during a single time interval. The terminal identification device transmits an identification command to the terminal and the terminal triggers and alternately inhibits a predetermined modification of at least some of the information bits necessary for playing a sound or displaying an image contained in the multimedia stream to obtain a modified multimedia stream and transmits the stream as a multimedia. The device acquires the modified stream transmitted by the terminal and determines the identifier of the terminal to which it belongs on the basis of the transmitted command and the presence or absence of the predetermined modification in the acquired stream.

26 Claims, 3 Drawing Sheets

(51) Int. Cl.
  *H04N 21/222* (2011.01)
  *H04N 21/266* (2011.01)
  *H04N 21/6543* (2011.01)
  *H04N 21/8358* (2011.01)
  *H04N 21/2347* (2011.01)
  *H04N 21/418* (2011.01)
  *H04N 21/4405* (2011.01)

(52) U.S. Cl.
  CPC . *H04N 21/25816* (2013.01); *H04N 21/26606* (2013.01); *H04N 21/4181* (2013.01); *H04N 21/4405* (2013.01); *H04N 21/6543* (2013.01); *H04N 21/8358* (2013.01)

(58) Field of Classification Search
  CPC ........... H04N 21/6543; H04N 21/4405; H04N 21/2347
  See application file for complete search history.

(56) References Cited

U.S. PATENT DOCUMENTS

| | | | |
|---|---|---|---|
| 2006/0146195 A1* | 7/2006 | Yoon | H04L 63/10 348/587 |
| 2007/0186110 A1* | 8/2007 | Takashima | H04L 9/0836 713/173 |
| 2008/0016349 A1* | 1/2008 | Kahn | G06F 21/10 713/168 |
| 2010/0325649 A1* | 12/2010 | Anguiano | H04N 21/2541 725/25 |
| 2011/0131413 A1* | 6/2011 | Moon | H04N 7/1675 713/168 |
| 2011/0213869 A1* | 9/2011 | Korsunsky | G06F 21/55 709/223 |
| 2012/0134484 A1* | 5/2012 | Prasad | H04M 3/42059 379/201.02 |
| 2012/0173342 A1 | 7/2012 | Rajaopadhye | |

* cited by examiner

TERMINAL IDENTIFICATION METHOD IN A SYSTEM FOR PROVIDING MULTIMEDIA CONTENT

RELATED APPLICATIONS

This application is a U.S. National Stage of international application number PCT/EP2014/061918 filed Jun. 6, 2014, which claims the benefit of the priority date of French Patent Application FR 1355324, filed Jun. 10, 2013, the contents of which are herein incorporated by reference.

FIELD OF INVENTION

The invention relates to a terminal identification method in a system for providing multimedia content. The invention also relates to a method for the generation by a terminal of a multimedia stream modified for the implementation of this method. The invention also relates to a method for the determination by a terminal identification device of a terminal identifier for the implementation of this identification method. The invention also relates to a terminal, a terminal identification device and an information-recording medium for the implementation of this identification method.

BACKGROUND

The system concerned for providing multimedia content is any support system of any service providing multimedia content online to a plurality of terminals.

The identifier concerned of a terminal of this type is an identifier accessible to this terminal. This identifier is specific to it, or specific to any other entity such as the user owning the terminal.

The multimedia content provided is audiovisual content, for example television programs, audio-only content, for example a radio program or more generally any digital content containing video and/or audio such as a computer application, a game, a slideshow, an image or any data set.

From this content, so-called temporal content will be considered more particularly below. Multimedia temporal content is multimedia content entailing a succession in time of sounds, in the case of audio temporal content, or images, in the case of video temporal content, or sound and images temporally synchronized with one another in the case of audiovisual temporal content. Multimedia temporal content may also comprise interactive temporal components synchronized with the sounds or images.

Multimedia temporal content of this type, notably when it is subject to rights such as copyright or similar rights, is typically provided in scrambled form for its protection by a Conditional Access System (CAS).

The terminology of the field of conditional access systems is thus used below in this document. The interested reader will be able, for example, to find a more complete presentation in the following document: "Functional Model of a Conditional Access System", EBU Review, Technical European Broadcasting Union, Brussels, BE, No. 266, Dec. 21, 1995.

In particular, the terms scrambling and descrambling are therefore used for the multimedia content protected by a CAS, as synonyms for the terms encryption and decryption, which continue to be used for the other data, such as notably the control words and keys.

Multimedia temporal content is acquired by the terminal receiving on-the-fly when it is transmitted by the operator of the service.

Multimedia temporal content is then descrambled, if it was scrambled, then decoded by the terminal in order to generate a multimedia stream in unscrambled form comprising at least one temporal succession of time intervals clocked at a predefined frequency, the set of information bits necessary for displaying a single complete image or for playing a sound on a multimedia apparatus being transmitted during a single time interval, and each time interval corresponding to a single image or to a single sound, this multimedia stream being able to be played by a multimedia apparatus connected to this terminal. The specific term "audio sample" will be used below to designate the set of information bits necessary for playing a sound on a multimedia apparatus. Here, the term "in unscrambled form" indicates the fact that the multimedia stream no longer needs to be descrambled in order to be played by a multimedia apparatus in a manner directly perceptible and intelligible to a human being. The term "multimedia apparatus" furthermore designates any device capable of playing the multimedia stream in unscrambled form, such as, for example, a television set.

The terminal identification methods are particularly useful for identifying the terminal(s) used to redistribute multimedia content in unscrambled form, disregarding the rights to which they are subject, i.e. illegally. These terminals, referred to below as "pirate" terminals, are used for this purpose in a content redistribution system. These pirate terminals are identical in every respect to the other terminals used in the system for providing multimedia content and differ only in terms of the use that is made of them.

An illegal redistribution of this type, applied to audiovisual content, typically employs:
a pirate terminal which uses a service for providing multimedia content in order to acquire and decode the multimedia content provided,
a multimedia apparatus connected to this terminal in order to play the multimedia content in unscrambled form, for example a television set,
a multimedia content redistribution system comprising:
    a camera to film the multimedia content as played, and generate a redistributable multimedia stream in unscrambled form, and
    a redistribution server which acquires the multimedia stream filmed by the camera and transmits it via a network to a plurality of terminals.

Users then use this redistribution system to receive, by means of a terminal, the multimedia stream in unscrambled form transmitted by this system. This redistribution system therefore allows a multitude of users to receive the multimedia stream in unscrambled form from the pirate terminal and not from the authorized operator of the content-providing service.

In such a context, it is particularly useful to identify the pirate terminal that is used in order to be able to implement countermeasures. This also allows the owner of the pirate terminal and the redistribution, or pirate, server to be traced in order to implement commercial and legal actions, for example, in respect thereof.

Methods for identifying the pirate terminal are known for this purpose. In these known methods:
a) the pirate terminal acquires then decodes multimedia temporal content in order to generate a multimedia stream in unscrambled form, and
b) a terminal identification device transmits an identification command to this pirate terminal.

In response to the identification command, the pirate terminal transmits to the multimedia apparatus, in addition to the multimedia stream in unscrambled form, an additional multimedia stream in which its identifier is encoded. In response to the reception of this additional multimedia stream, the multimedia apparatus displays the identifier of the pirate terminal, superimposed on the images of the multimedia stream in unscrambled form. The images filmed by the camera and then transmitted to the redistribution system then comprise the identifier of the pirate terminal.

In parallel, the identification device is connected to the redistribution system in such a way as to acquire the multimedia stream redistributed by this system. The identification device then acquires this redistributed multimedia stream and analyses it in order to extract the identifier of the pirate terminal from it. These known methods are referred to as "fingerprinting".

These fingerprinting methods thus enable identification of the pirate terminal that is used. It is said that they allow the pirate to be traced.

Their first disadvantage is that these fingerprinting methods are based on the addition of an information stream supplementing the multimedia stream in unscrambled form. In terms of detectability by the pirate and robustness, this has the disadvantage that it is relatively simple for the pirate to disable them. He can, in fact, detect the additional information stream added to the multimedia stream in unscrambled form through automatic analysis of the multimedia stream that is to be redistributed, typically by means of a probe placed at the output of the terminal composer. Having detected it, he can then remove it in such a way as to re-establish the multimedia stream in unscrambled form. The redistributed multimedia stream then no longer comprises any means enabling the pirate terminal to be identified.

The identifier being clearly visible on the multimedia apparatus playing the redistributed multimedia stream, the pirate can therefore furthermore detect the additional information stream with the naked eye, i.e. more easily than through the automatic analysis mentioned above. He can then easily disable the fingerprinting method by concealing the identifier when it is displayed on the screen filmed by the camera or by then interrupting the redistribution of the multimedia stream. In terms of detectability by the pirate and robustness, the fingerprinting methods thus have an additional disadvantage.

Due to the visibility of the identifier on the multimedia apparatus playing the multimedia stream in unscrambled form, a priori disturbing for the legitimate users of the multimedia content, the fingerprinting methods furthermore have a second disadvantage in terms of impact on the experience of these users.

In order to overcome these disadvantages of the fingerprinting methods, other methods, referred to as "watermarking", have been proposed. They consist in adding as discreetly as possible, i.e. barely detectable or undetectable to the human eye, the identifier to the multimedia stream in unscrambled form. This addition may, for example, be effected by means of small parts distributed in the images of which the succession in time constitutes the playing of the multimedia temporal content. In these watermarking methods, a multimedia apparatus receiving the multimedia stream modified in this way plays the multimedia stream in unscrambled form and simultaneously displays the identifier in parts. It therefore typically displays in a superimposed manner the video components of the multimedia stream in unscrambled form and a variable part of the identifier in such a way that the identifier is barely visible or invisible to the human eye on the multimedia apparatus.

These watermarking methods complicate the detection of the additional information stream through automatic analysis of the multimedia stream that is to be redistributed. They therefore alleviate the disadvantage of the fingerprinting methods in terms of detectability by the pirate. However, they do not eliminate this first disadvantage, and therefore remain prone to being disabled in the same way. These improvements are furthermore achieved at the expense of a new disadvantage in terms of complexity of the solution in terms of both the insertion and extraction of the identifier in the multimedia stream.

Prior art is also known from documents US 2001/054150 A1, US 2012/173342 A1, and US 2004/111740 A1.

SUMMARY OF INVENTION

The invention aims to overcome the first disadvantage outlined above, common to all of the known methods, in terms of detectability by the pirate and robustness, by means of a solution that is simple to develop and implement.

The subject-matter of the invention is therefore a terminal identification method in a system for providing multimedia content as claimed in claim 1.

In a method of this type, the identification device determines, in step d), the identifier of the terminal independently from the content of the predetermined modification. This content does not therefore supply information to the method, so that the predetermined modification effects only a destruction of information from the original multimedia stream. In fact, the original values of the modified information bits do not appear in the modified multimedia stream and cannot be restored there. The original multimedia stream cannot therefore be restored by removing the additional information stream, which overcomes the first disadvantage described above in terms of detectability by the pirate and robustness, and makes this method much more robust than the known methods.

Due to this same characteristic, a method of this type offers the additional advantage of being applicable to an audio component of the multimedia temporal content.

The embodiments of this terminal identification method may comprise one or more of the characteristics of the dependent claims of the terminal identification method.

These embodiments of this terminal identification method furthermore have the following advantage:
the configuration, on verification of a precondition constructed in such a way as to be verified only by some of the terminals to which the identification command is transmitted, of the triggering of the predetermined modification allows the number of terminals likely to trigger this modification to be limited, thereby limiting the second disadvantage explained above in terms of impact on the experience of the legitimate users of the multimedia temporal content.

The subject-matter of the invention is also a method for the generation by a terminal of a modified multimedia stream as claimed in claim 5.

The embodiments of this generation method may comprise one or more of the characteristics of the dependent claims of the method for the generation by a terminal of a modified multimedia stream.

These embodiments of the method for the generation by a terminal of a modified multimedia stream furthermore offer the following advantages:
the triggering of the predetermined modification after having allowed the expiry of a duration equal to a duration calculated according to the identifier of the terminal allows the communication to the identification device of additional information relating to the identifier of the terminal, thereby reducing the number of identification commands necessary for the identification of the terminal and thereby limiting the second disadvantage explained above in terms of impact on the experience of the legitimate users of the multimedia temporal content;

the limitation of the duration calculated above according to a limit parameter if this calculated duration exceeds a duration determined according to this limit parameter allows the total time necessary for the identification of the terminal to be limited;

the triggering of the predetermined modification of at least some of the information bits necessary for playing a sound or displaying a complete image contained in the multimedia stream, repeated in such a way that the playing duration of the sounds or complete images thus modified is equal to a playing duration calculated by the terminal according to its identifier, also enables additional information relating to the identifier of the terminal to be communicated to the identification device, thereby reducing the number of identification commands necessary for the identification of the terminal and thereby limiting the second disadvantage explained above in terms of impact on the experience of the legitimate users of the multimedia temporal content.

The subject-matter of the invention is also a method for determining a terminal identifier as claimed in claim 10.

The subject-matter of the invention is also an information-recording medium comprising instructions for carrying out one of the two above methods when these instructions are executed by an electronic processor.

The subject-matter of the invention is also a terminal as claimed in claim 11.

Finally, the subject-matter of the invention is a terminal identification device as claimed in claim 13.

The invention will be better understood from a reading of the description which follows, given only as a non-limiting example, and with reference to the drawings.

DETAILED DESCRIPTION

In the figures, the same references are used to denote the same elements.

The characteristics well known to the person skilled in the art are not described in detail in the description below.

Figure 1:
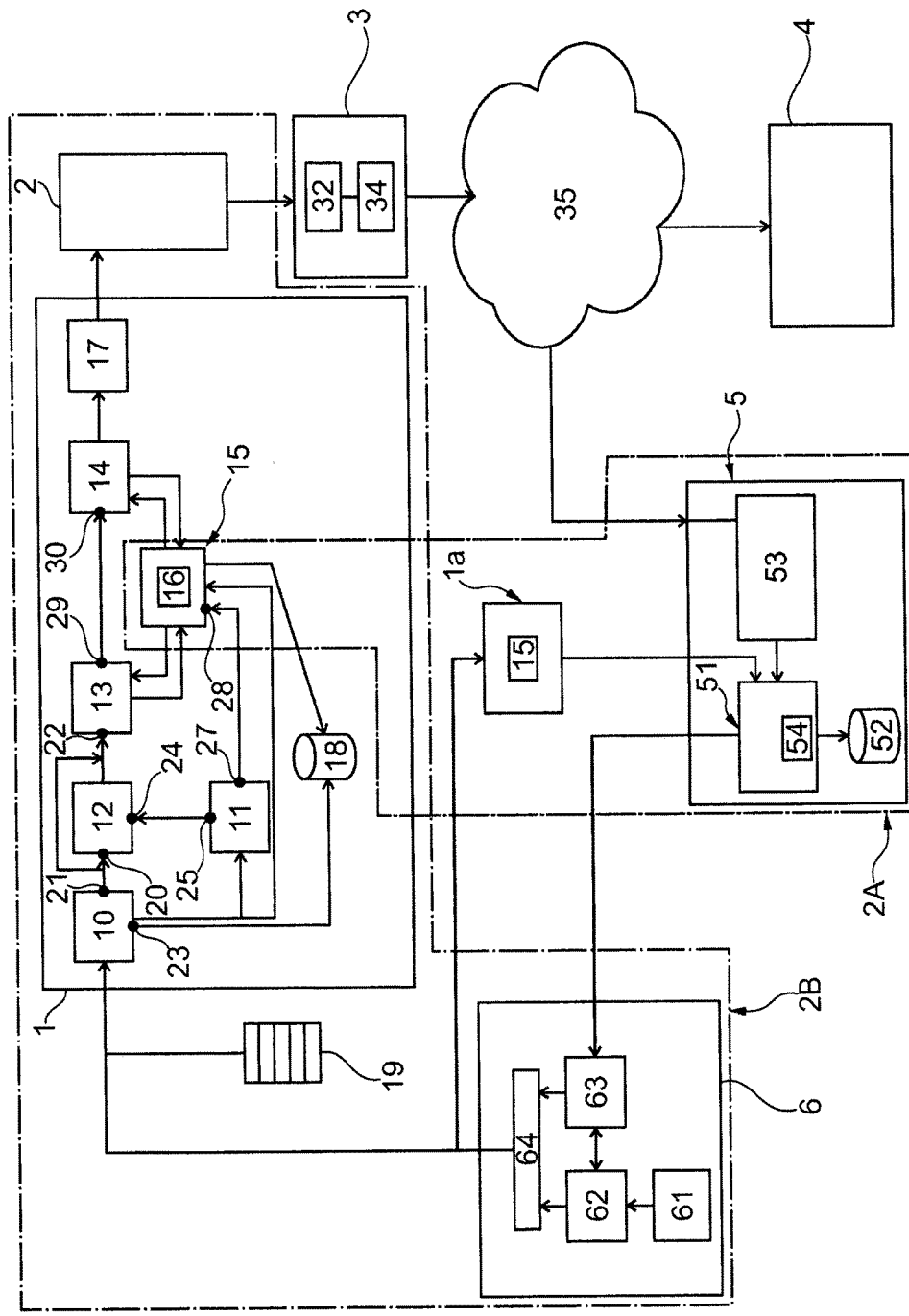
FIG. 1 is a schematic representation of the architecture of a system for providing multimedia content.

FIG. 1 shows a system 2A for implementing a terminal identification method in a system 2B for providing multimedia content. As well as the latter, FIG. 1 shows a system 3 for redistributing multimedia content.

The system 2B comprises a network head 6 and a plurality, typically thousands, of terminals 1, to each of which at least one multimedia apparatus 2 is connected. To simplify the illustration, only one terminal 1 to which only one multimedia apparatus 2 is connected is shown in FIG. 1.

For example, the multimedia apparatus 2 is a television set, and the link between the terminal 1 and the multimedia apparatus 2 is in HDMI, for High Definition Multimedia Interface, format.

The network head 6 is able to transmit scrambled multimedia content to all of the terminals 1. To do this, it comprises a coder 61, a scrambler 62, an access configuration module 63 and a multiplexer 64.

The scrambler 62, the input of which is connected to the output of the coder 61, comprises a first output and a second output.

The access configuration module 63 has first and second inputs connected to the second output of the scrambler 62 and to an output of a terminal identification device 5 respectively.

The multiplexer 64 has first and second inputs connected to the first output of the scrambler 62 and to the output of the access configuration module 63.

Here, the system 2B comprises a player 19 associated with the terminal 1. The player 19 is any mechanical media player of multimedia temporal content, such as, for example, a digital audio or video disc player.

The terminal 1 is able to acquire multimedia temporal content, either receiving on-the-fly when it is transmitted by the network head 6 or the player 19, or playing from a recording medium 18 on which it has previously been recorded. In this particular embodiment, the terminal 1 comprises the recording medium 18. The acquired multimedia temporal content may be scrambled or unscrambled.

The terminal 1 is also able to decode the acquired multimedia temporal content in order to generate a multimedia stream in unscrambled form. This multimedia stream is played by the multimedia apparatus 2 connected to this terminal.

To do this, the terminal 1 comprises an acquisition module 10, a conditional access module 11, a descrambler 12, a decoder 13, a composer 14 and a controller 17.

Finally, the terminal 1 is able to trigger, according to an identifier of the terminal or of a group of terminals to which it belongs, a predetermined modification of at least some of the information bits necessary for playing a sound or displaying a complete image contained in the multimedia stream in such a way as to obtain a modified multimedia stream. Finally, it also comprises a multimedia stream modification module 15 for this purpose.

The acquisition module 10 comprises outputs 21 and 23.

The conditional access module 11, the input of which is connected to the output 23, comprises outputs 25 and 27.

The descrambler 12 has its inputs 20 and 24 connected to the outputs 21 of the acquisition module 10 and 25 of the conditional access module 11 respectively.

The decoder 13 has an input 22 connected to the output of the descrambler 12.

The composer 14 has an input 30 connected to an output 29 of the decoder 13.

The multimedia stream modification module 15 has an input 28 connected to the output 27 of the conditional access module 11. Here, it can be activated by both the decoder 13 and the composer 14 to which it is therefore also connected.

The module 15 is equipped with a programmable electronic processor 16 capable of executing instructions recorded on an information-recording medium. For this purpose, the processor 16 is connected to the memory 18. This memory 18 comprises instructions necessary for implementing the method shown in FIG. 3. These instructions notably comprise those of a multimedia stream modification algorithm.

The controller 17 has its input connected to an output of the composer 14. For example, if the link between the terminal 1 and the multimedia apparatus 2 is in HDMI format, the controller 17 is referred to as the HDMI controller.

The multimedia content redistribution system 3 is able to capture the multimedia stream in unscrambled form as played by the multimedia apparatus 2 in order to generate a redistributable multimedia stream and transmit it via a network 35 to a plurality of terminals 4. The system 3 comprises a camera 32 and a redistribution server 34 for this purpose. The redistribution server 34 has its input connected to the output of the camera 32, and its output, via a network 35, to the plurality of terminals 4.

The network 35 is a wide area network for information distribution such as the World Wide Web, better known by the term "Internet" network.

The system 2A comprises the terminal identification device 5. This device 5 is able to:

construct an identification command 8 (FIG. 2) and transmit it to the terminals 1, acquire a redistributed multimedia stream via the network 35 from the multimedia content redistribution system 3 and determine the identifier of the terminal 1 or of a group of terminals to which the terminal 1 belongs on the basis of the transmitted identification command 8 and the presence or absence, in response, of a predetermined modification in the acquired multimedia stream.

To do this, the device 5 comprises a redistributed multimedia stream acquisition module 53, a terminal identification module 51 and an information-recording medium 52.

The module 53 has its input connected to the network 35.

The module 51 has its input connected to an output of the module 53.

The module 51 is equipped with a programmable electronic processor 54 capable of executing instructions recorded on an information-recording medium. For this purpose, the processor 54 is connected to the memory 52. This memory 52 comprises instructions necessary for implementing the method shown in FIG. 3. These instructions notably comprise those of a terminal identification algorithm.

Here, the system 2A also comprises a synchronizer 1a, connected to the content-providing system 2B. The role of the synchronizer 1a is to allow the device 5 to determine the time at which the terminals 1 have received a given identification command. To do this, the synchronizer 1a is able to receive the identification command transmitted by the head 6 and transmit its reception date to the device 5. For example, the synchronizer 1a is identical to the terminal 1 except that its multimedia stream modification module 15 has an output connected to an input of the module 51.

Figure 2:
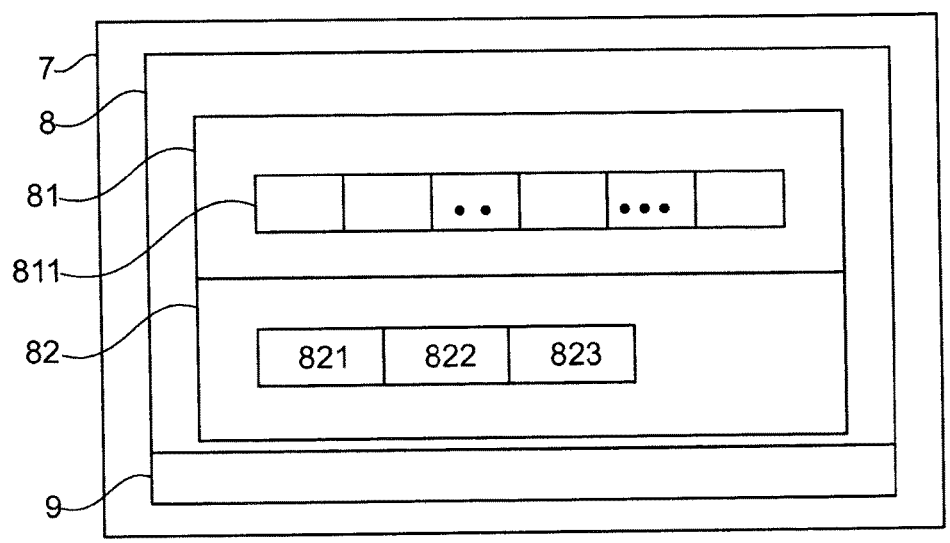
FIG. 2 is a schematic representation of the structure of an Entitlement Control Message (ECM) used to transmit an identification command.

FIG. 2 shows a message ECM 7 used, in one preferred embodiment, to transmit an identification command.

The ECM 7 has the ECM structure 9 well known to the person skilled in the art of conditional access systems, and furthermore encapsulates the identification command 8.

The ECM structure 9 notably encapsulates the conditions for accessing the content with which the ECM 7 is associated, and the control word or key that was used to scramble this content.

The identification command 8 comprises a precondition 81 and a list 82 of parameters.

The precondition 81 tests the presence or the value of at least one prerecorded datum in a terminal. It is constructed in such a way as to be verified only by some of the terminals to which the identification command is transmitted. Each tested datum is typically chosen from the group consisting of: an identifier of the terminal, an event identifier, an entitlement identifier, an operating time, an operating period identifier. However, other data allowing the pirate terminals and the terminals legitimately used to be distinguished can also be considered.

Here, the precondition 81 is a logical combination 811 of criteria, each of a type chosen from a set comprising the following types:

an index criterion comprising a value parameter, true if the bit of the identifier of the terminal, having an index given by the value parameter, has a predetermined value, an identifier criterion comprising a value parameter and a mask parameter, true if the terminal identifier bits selected or masked by the mask parameter have the same values as those of the value parameter, an identifier criterion comprising a mask parameter and a total number parameter, true if the number of terminal identifier bits selected or masked by the mask parameter which have a predetermined value is equal to the total number parameter, an event criterion comprising a list of event identifiers, true if each of the event identifiers on the list is stored in the terminal, an event criterion comprising a list of event identifiers, true if each of the event identifiers on the list is not stored in the terminal, an entitlement criterion comprising a list of entitlement identifiers, true if each of the entitlement identifiers on the list is stored in the terminal, an entitlement criterion comprising a list of entitlement identifiers, true if each of the entitlement identifiers on the list is not stored in the terminal, an operating time criterion comprising a duration parameter, true if the terminal has been in operation for a duration greater than that expressed by its duration parameter, an operating time criterion comprising a duration parameter, true if the terminal has been in operation for a duration less than that expressed by its duration parameter, an operating period criterion comprising a list of associations of time intervals with a channel, true if, for each of the associations, the terminal has been in operation on this channel during each of these time intervals, an operating period criterion comprising a list of associations of time intervals with a channel, true if, for each of the associations, the terminal has not been in operation on this channel during each of these time intervals.

An event is a phenomenon identifiable by the terminal which, when it occurs, triggers the recording by the terminal of an identifier of this event. Conversely, if this event does not occur, no identifier of this event is recorded by the terminal. The event identifier enables this event to be distinguished from all the other events identifiable by the terminal.

Examples of preconditions 81 will now be given. In these examples, the following notations are used:

UA is the value of the identifier of the terminal 1,
VALUE is the value of the value parameter,
MASK is the value of the mask parameter,
HASONE is the value of the total number parameter,
EVENT designates an event criterion,
ENT designates an entitlement criterion,
AWAKE designates an operating duration criterion,
OPER designates an operating period criterion.

In these examples, the numerical values are given in hexadecimal notation and only by way of example.

EXAMPLE 1

In this precondition, VALUE denotes the position, here the index, of the bit of the identifier of the terminal 1, the value of which must be tested. For example, if VALUE=0x02, the precondition is satisfied if the second bit of UA is equal to one. If not, the precondition is not verified. This precondition comprises a single index criterion.

EXAMPLE 2

In this precondition, VALUE is a predetermined value between 0x00 and 0xFF and MASK is a value used to select or mask one or more bits of the values VALUE and UA. The precondition is satisfied only if the bits selected in VALUE and UA are identical. For example, if VALUE=0xF1 and MASK=0x03, the precondition is satisfied only if the last two bits (since MASK=0x03) of UA have the same values as the last two bits of VALUE, i.e. 0 and 1. The precondition in this example comprises a single identifier criterion, itself comprising a value parameter and a mask parameter.

EXAMPLE 3

In this precondition, MASK is a value used to select or mask one or more bits of the value UA, and HASONE is an integer value less than 16, in decimal notation. The precondition is satisfied only if the total number of bits selected in UA which have a value 1 is equal to HASONE. The precondition in this example comprises a single identifier criterion, itself comprising a mask parameter and a total number parameter.

EXAMPLE 4

In this precondition, 0 and 1 are event identifiers which have been preregistered in a terminal. The precondition comprising the sole event criterion EVENT (0, 1) is satisfied only if each of the two events 0 and 1 is registered in the terminal 1. The EVENT criterion takes as its argument a list of event identifiers having any total number.

EXAMPLE 5

In the same situation as above, the precondition comprising the sole event criterion—EVENT (0, 1) is satisfied only if none of the events 0 and 1 is registered in the terminal 1.

EXAMPLE 6

In this precondition, PPV1 and PPV2 are entitlement identifiers which have been preregistered in a terminal, for example following the acquisition from the system 2B of on-demand sessions S1 and S2. The precondition comprising the sole entitlement criterion ENT (PPV1, PPV2) is satisfied only if each of the entitlements PPV1 and PPV2 is registered in the terminal 1. The criterion ENT takes as its argument a list, having any total number, of entitlement identifiers.

EXAMPLE 7

In the same situation as above, the precondition comprising the sole entitlement criterion—ENT (PPV1, PPV2) is satisfied only if none of the entitlements PPV1 and PPV2 is registered in the terminal 1.

EXAMPLE 8

In this precondition, d is the value in hours of a duration parameter; for example d=24. The precondition comprising the sole operating duration criterion AWAKE(d) is satisfied only if the terminal 1 has been active for at least 24 hours.

EXAMPLE 9

In the same situation, the precondition comprising the sole operating duration criterion—AWAKE(d) is satisfied only if the terminal 1 has been active for less than 24 hours.

EXAMPLE 10

In this precondition, d1, d2, d3 and d4 are dates, and CHAN1 and CHAN2 are the identifiers of channels supporting content services supported by the content-providing system 2B. The precondition comprising the sole operating period criterion OPER ((CHAN1, (d1, d2)), (CHAN2, (d3, d4))) is satisfied only if the terminal 1 was used to receive the channel CHAN1 between the dates d1 and d2, and to receive the channel CHAN2 between the dates d3 and d4. The criterion OPER takes as its argument a list, having any total number, of associations between a channel identifier and an operating period described by means of two dates.

The precondition 81 may comprise any logical combination of such criteria by means of the Boolean operators "not", "or" and "and". For example, the precondition 81 is the conjunction or disjunction of the set of criteria which constitute it, true if each, or at least one, respectively, of these criteria is true.

The list 82 of parameters comprises a delay parameter 821, a limit parameter 822 and a bit group identifier parameter 823. The delay parameter 821 expresses a duration, the limit parameter 822 expresses a duration limit, and the bit group identifier parameter 823 designates a group of bits of the identifier of a terminal. This group of bits is, for example, the group of bits, possibly having a given length, of an identifier of a terminal, beginning with its given index bit.

For example, the delay parameter 821 and the limit parameter 822 are integers R and B respectively, expressing two durations in seconds; the bit group identifier parameter 823 is a pair of integers (i, L), designating the index i, in the terminal identifier, of the first bit of the group of bits concerned, and its length L, i.e. its total number, respectively.

The operation of the systems 2A, 2B and 3 will now be described with reference to the method shown in FIG. 3.

Before the terminal identification system 2A, the multimedia content providing system 2B and the multimedia content redistribution system 3 are implemented in a manner well known to the person skilled in the art.

For the implementation of the system 2B, during a step 142, the coder 61 first receives multimedia temporal content, compresses it in order to generate compressed multimedia content and transmits it to the scrambler 62. The scrambler 62 then scrambles the compressed multimedia content by means of a control word in order to generate scrambled multimedia content. The scrambler 62 finally transmits the control word to the access configuration module 63 and the scrambled multimedia content to the multiplexer 64.

During a step 144, the module 63 then encapsulates the control word in a message ECM to which it imparts the structure 9, and transmits this message to the multiplexer 64.

During a step 146, the multiplexer 64 then synchronizes the scrambled multimedia content and the message ECM in order to generate synchronized multimedia content. The multiplexer 64 then transmits the synchronized multimedia content to the terminals 1.

A terminal 1 then acquires then decodes, during steps 101, 103, 105, 107 and 109, the synchronized multimedia content.

During step 101, the module 10 acquires the synchronized multimedia content receiving on-the-fly when it is transmitted by the network head 6, then demultiplexes it to extract the scrambled multimedia content and the message ECM from it. The acquisition module 10 then transmits the scrambled multimedia content to the descrambler 12 and the message ECM to the conditional access module 11.

During step 103, the conditional access module 11 then extracts the control word from the ECM message and transmits it to the descrambler 12.

During step 105, the descrambler 12 descrambles the scrambled multimedia content by means of the control word in such a way as to restore the compressed multimedia content in unscrambled form and transmit it to the decoder 13. The decoder 13 decompresses the compressed multimedia content in unscrambled form, in such a way as to restore the decompressed components of a multimedia stream, and transmits these components to the composer 14. In the case of multimedia temporal content, these components include at least one video component or one audio component.

During step 107, the composer 14 combines the components of the multimedia stream in order to make up the multimedia stream, then transmits it to the controller 17.

During step 109, the controller 17 configures the multimedia stream in accordance with the protocol required by the link between the terminal 1 and the multimedia apparatus 2, and transmits it on the output of the terminal 1 to the multimedia apparatus 2. For example, if the controller 17 is an HDMI controller, this protocol is TDMS, for Transition Minimized Differential Signaling. The multimedia apparatus 2 finally plays the multimedia stream in unscrambled form.

For the implementation of the multimedia content redistribution system 3, during a step 150, the camera 32 films the multimedia stream in unscrambled form as played by the multimedia apparatus 2 in order to generate a redistributable multimedia stream in unscrambled form, and transmits the latter to the redistribution server 34. During step 150, the redistribution server 34 then transmits the redistributable multimedia stream in unscrambled form via the network 35 to the plurality of terminals 4.

For the implementation of the system 2A, during a first step 110, the terminal identification device 5 transmits an identification command to all the terminals 1 and to the synchronizer 1a.

To do this, during an operation 112, the terminal identification module 51 constructs an identification command 8 comprising a list 82 of parameters.

Here, according to the terminal identification strategy implemented, the terminal identification module 51 sets the values R, B and (i, L) of the delay parameter 821, the limit parameter 822, and the bit group identifier parameter 823 respectively. The first two are typically set at the instigation of a user during the configuration of the terminal identification device 5, or during the activation of the terminal identification method. The value of the group identifier is set by the electronic processor 54, according to the preceding iterations and the instructions which implement this strategy and which it executes.

Then, during an operation 114, the terminal identification module 51 constructs a precondition 81 and inserts it into the identification command 8.

Here, according to the terminal identification strategy implemented and the terminals to be targeted, the module 51 defines, in particular, the list of criteria, and their logical combination, constituting the precondition 81.

Then, during an operation 116, the module 51 transmits the command 8 to the network head 6.

Then, during steps 144 and 146 already described, the network head 6 transmits the command 8 to the terminals 1 and to the synchronizer 1a. In particular, during step 144, the access configuration module 63 encapsulates the command 8 in the message ECM, thus imparting the structure 7 to it, after having imparted the structure 9 to it by encapsulating a control word therein, and transmits this message ECM 7 to the multiplexer 64.

During steps 101 and 103 already described, the terminal 1 and the synchronizer 1a then acquire the command 8.

In particular, during step 103, in addition to the control word, the conditional access module 11 extracts the command 8 from the message ECM 7, then transmits it to the multimedia stream modification module 15.

In response, during a step 118, the module 15 of the synchronizer 1a transmits the reception date of this command 8 to the module 51. The reception date is, for example, expressed with a precision of one second, or greater.

In parallel, in response to the command 8, the module 15 of each terminal 1 moves on to a step 120. During this step 120, the module 15:

evaluates, during an operation 121, the precondition 81 of the identification command 8, calculates then limits, during operations 123 and 125 respectively, a trigger delay, calculates, during an operation 127, a playing duration, and, during an operation 129, triggers or performs the predetermined modification of at least some of the information bits necessary for playing a sound or displaying a complete image contained in the multimedia stream in such a way as to obtain a modified multimedia stream, then transmits the latter to the composer 17.

For this purpose, during operation 121, the module 15 determines whether the precondition 81 is satisfied by the identifier of the terminal 1. If this test is positive, the following operations 123, 125, 127 and 129 of step 120 are implemented by this module 15; if not, step 120 is interrupted. When step 120 is interrupted, the multimedia stream transmitted to the apparatus 2 is not modified.

The occurrence or not of the predetermined modification in the multimedia stream transmitted by the composer 17, i.e. in the subsequently redistributed multimedia stream, therefore indicates the satisfaction or not of the precondition 81 by the identifier of the terminal 1.

During operation 123, the module 15 calculates a trigger delay. For example, the trigger delay is calculated as being the product of the value R of the delay parameter 821 and a value of the group of bits of UA identified by the bit group identifier parameter 823. This value is, for example, calculated as the value in decimal notation of the identified group of bits. The calculated value of the delay being a function of the value of the identifier, the implementation of this delay therefore enables this additional information on the value UA to be transmitted to the device 5.

During operation 125, the module 15 limits the previously calculated trigger delay. For this purpose, if the calculated trigger delay is greater than the value B of the limit parameter 822, the module 15 assigns this value B to the trigger delay. If not, the previously calculated value of the trigger delay is left unchanged.

During operation 127, the module 15 calculates a playing duration, for example in the same way as it calculates the trigger delay during operation 123 already described. During the same operation 127, the module 15 can then limit the calculated playing duration in a manner similar to that already described for the trigger delay in operation 125. Any other method for calculating a playing duration can, however, be implemented. The calculated playing duration being a function of the value of the identifier, it therefore enables information on the value UA to be transmitted to the device 5.

Finally, during operation 129, the module 15 then triggers a predetermined modification of the information bits necessary for playing a sound or displaying a complete image contained in the multimedia stream in such a way as to obtain a modified multimedia stream. For this purpose, the module 15 first allows the expiry, from the time of reception of the command 8, of a duration equal to the trigger delay calculated then limited during operations 123 and 125. The module 15 then performs the predetermined modification. The module 15 finally repeats the implementation of this modification on successive sounds or complete images of the multimedia stream in such a way that the playing duration of the sequence of sounds or complete images thus modified is equal to the playing duration calculated during operation 127.

The predetermined modification of at least some of the information bits necessary for playing a sound or displaying a complete image contained in the multimedia stream is independent from the value of the identifier of the terminal 1. Examples of the content of this modification will be given below. For example, it systematically consists in the assignment of the value zero to the bits describing a complete image contained in the multimedia stream. Alternatively, this predetermined modification consists, for example, in replacing the bits describing the complete image concerned with those describing the complete image preceding it in the multimedia stream. The predetermined modification may finally also consist in replacing the bits describing the complete image concerned with those describing a third-party image, for example outside the multimedia stream. These modifications are visible and/or audible when the modified multimedia stream is played by the multimedia apparatus 2.

The same predetermined modification is typically programmed in all of the terminals 1 before they are commissioned.

The observation of a given trigger delay of the predetermined modification, or of a given playing duration of the complete images or sounds supporting it, in the modified multimedia content transmitted by the composer 14, i.e. subsequently in the redistributed multimedia stream, then acquired by the terminal identification device 5, thus enables the previously calculated total number of the group of bits of the identifier of the terminal identified by the bit group identifier parameter 823 to be communicated to this device 5.

Then, during step 107 already described, the components of the multimedia stream combined by the composer 14 in order to make up the multimedia stream then transmitted to the controller 17 comprise at least one video component containing the complete images to which the predetermined modification was applied in operation 129. The resulting multimedia stream is referred to as the modified multimedia stream.

Then, during step 109, the terminal 1 transmits this modified multimedia stream as a multimedia stream to be played by the multimedia apparatus 2. Consequently, the multimedia apparatus 2 plays the modified multimedia stream in unscrambled form.

In particular, during step 109, when the multimedia apparatus 2 plays a sequence of sounds or complete images modified during operation 129, the occurrence of the modification in the multimedia stream is made visible or audible if the playing duration of the sequence is sufficient for its perception by a human being. For example, the display of a sequence of images, the value zero having been assigned to the descriptive bits thereof, manifests itself as a black screen, the playing duration of which is that of the sequence of the images thus modified. Alternatively, the display of a sequence of images, the descriptive bits of which have been replaced with those of the image preceding the sequence, or those of a third-party image, for example, outside the multimedia stream, manifests itself as the freezing of the replaced image for a duration equal to the playing duration of the sequence of the images thus modified. Similarly, the playing of a sequence of sounds, the value zero having been assigned to the descriptive bits thereof, manifests itself as a silence, the duration of which is the playing duration of the sequence of sounds thus modified. Alternatively, the playing of a sequence of sounds, the descriptive bits of which have been replaced with those of the sound preceding the sequence, or those of a third-party sound, for example outside the multimedia stream, manifests itself as the holding of the replaced sound for a duration equal to the playing duration of the sequence of sounds thus modified.

Then, during step 150, this modified multimedia stream is again filmed by the camera 32 and transmitted to the redistribution server 34 then, by the latter, to the terminals 4 and to the device 5.

Finally, during a step 130, the terminal identification device 5 acquires the modified multimedia stream transmitted by the terminal 1 and determines the identifier of the terminal or of the group of terminals to which it belongs on the basis of the identification command 8 and the presence or absence, in response, of the predetermined modification in the acquired multimedia stream.

For this purpose, the redistributed multimedia stream acquisition module 53 acquires the redistributed multimedia stream then transmits it to the terminal identification module 51 which determines the identifier of the terminal 1 used to redistribute the multimedia content.

The determination of the identifier of the terminal 1 is performed on-the-fly at the time of acquisition of the redistributed multimedia stream.

For this purpose, the terminal identification module 51 performs an analysis of the redistributed multimedia stream, the aim of which is to detect the occurrence of the predetermined modification in the redistributed multimedia stream.

Given that the predetermined modification is the same, regardless of the identifier of the terminal 1, said modification is known in advance to the module 51 which can therefore easily find it in the redistributed multimedia stream.

According to whether this search is successful or not, the module 51 infers from it whether or not the identifier of the terminal 1 satisfies the precondition 81 of the identification command 8, which enables one or more bits of this identifier to be determined. Furthermore, if operation 123 has been implemented, the module 51 notes the time when the first image having undergone the predetermined modification appears in the redistributed stream. It is assumed here for simplification that the propagation time of the multimedia stream from the camera 32 to the device 5 is negligible compared with the delay calculated during operation 123. Under these conditions, the difference between this first time and the reception time transmitted by the synchronizer 1*a* allows the value of the delay used in operation 129 to be calculated. Similarly, if operation 127 has been implemented, the module 51 notes, in addition to the first time, a second time corresponding to the time when the last image having undergone the predetermined modification appears in the redistributed stream. The difference between the first and second times enables the playing duration used during operation 129 to be calculated.

Thus, the performance of step 130 reveals information on the identifier of the terminal 1 used by the system 3.

According to the adopted strategy, the reiteration of steps 110 to 130 may enable the identifier of the terminal 1 to be completely determined. Different examples of strategies likely to be implemented using the system 2B are now described:

Strategy 1):

The precondition 81 tests a different bit of the identifier of the terminal 1 for each performance of operation 121. It therefore suffices to reiterate steps 110, 120 and 130 as many times as there are bits in the terminal identifier. The identification algorithm employed is then a "sequential elementary" algorithm. In order to implement this first strategy example, the parameters 821, 822 and 823 are not used. The values of these parameters are left empty for this purpose during step 110. Under these conditions, operations 123 and 125 are omitted and operation 127 is modified so that the playing duration is equal to a constant independent from the value of the identifier of the terminal 1.

Strategy 2):

The trigger delay parameter 821 and the bit group identifier parameter 823 have been given non-zero values during operation 112 and steps 123 and 125 are performed. During step 130, the terminal identification module 51 determines a delay of the predetermined modification as the duration separating the start of the segment concerned of the redistributed multimedia stream and the occurrence of this modification in this stream. For example, the module 51 determines this duration as the playing duration of the images separating the first image of the segment concerned of the redistributed multimedia stream and the first image of this stream carrying the predetermined modification, i.e. the quotient of the number of these images and their frequency.

The terminal identification module 51 then infers additional information on the identifier of the terminal 1 from this delay of the predetermined modification and from the values of the trigger delay parameter 821 and the bit group identifier parameter 823. More precisely, this additional information is the value, calculated during operation 123, of the group of bits identified by the parameter 823. For example, the module 51 calculates it as being the quotient of the delay of the predetermined modification and the value of the parameter 821. This value is, for example, the decimal value of the identified group of bits, and its binary coding then supplies this group of bits itself.

As above, the repetition of strategy 2 for each group of bits having a given length of the identifier of the terminal 1 suffices to determine the value of each of the bits of this identifier, and therefore this identifier as a whole. This involves an algorithm "by group of bits having a given length".

In strategy 2), the limit parameter 822 is empty and operation 125 is not performed.

With the strategy 2), the number IT of iterations necessary for discovering the identifier of the terminal 1 as a whole is set and equal to Ent(N/G)+1, where:

N is the number of bits of the identifier of the terminal 1,
G is the length of each group of bits,
Ent( ) is the integer part function.

Strategy 3):

Strategy 3) is a combination of strategies 1) and 2). For this purpose, the precondition 81 tests the value of the first bit of the identifier of the terminal 1 not already determined. A non-zero value is assigned to the delay parameter 821. The parameter 823 identifies the group of the last bits of the identifier of which the first bit is the bit tested by the precondition 81. During operation 123 and step 130, the value of this group of bits is taken as equal to the number of first consecutive bits of the group of bits identified by the parameter 823 having the same value as the first bit. In this example, the identifier of the terminal 1 is completely determined, step-by-step, according to a Run Length Encoding (RLE) algorithm.

This strategy offers the advantage of reducing on average to almost N/4 the number of iterations of the steps 110, 120 and 130 necessary for determining all the bits of the identifier of the terminal 1, where N is the number of bits of the identifier. By comparison, the number of iterations is N if strategy 1) is implemented.

Strategy 4):

Strategy 4 is the same as strategy 3), except that the limit parameter 822 has a non-zero value. The value of the parameter 822 must then be taken into account in the additional information calculation. For example, if the delay, determined in step 130, of the predetermined modification is equal to the value of the parameter 822, the module 51 infers from it that the trigger delay initially calculated during operation 123 was greater than or equal to this value of the parameter 822. The module 51 infers from this that the B/R −1 bits immediately following the bit tested by the precondition 81 have the same value as this bit tested by the precondition 81.

This strategy 4) entails an average number of iterations of steps 110, 120 and 130 close to that of strategy 3) while limiting the maximum duration of the delay applied to the predetermined modification.

Numerous other embodiments of the invention are possible. For example, the multimedia temporal content can be provided by the system 2B, protected by a conditional access system, but without being scrambled. The scrambling and descrambling operations being performed in the description must then be omitted, as well as the encapsulation of the control word in the message ECM. The ECM structure 9 may not therefore encapsulate a control word. Furthermore, the scrambler 62 and the descrambler 12 may not then appear in the multimedia content providing system 2B.

The multimedia temporal content may also be provided by the system 2B, protected by means of a Digital Rights Management (DRM) system. The access configuration module 63 and the conditional access configuration module 11 are then replaced with a content configuration module and a license server, and by a digital rights management module respectively. The scrambling and descrambling operations are replaced with encryption and decryption operations, performed by an encryption module and a decryption module replacing the scrambler 62 and the descrambler 12 respectively. The ECM 7 is then finally replaced with a digital rights management license, the structure of which, well known to the person skilled in the art, encapsulates, instead of the content access conditions, the description of the uses that it is permitted to make thereof and, instead of the control word, the key required for its decryption. The identification command 8 is then incorporated into this license.

Alternatively, the multimedia temporal content may also be provided by the system 2B, protected by any other type of content protection system, such as, for example, a more conventional data protection system not performing any access rights management. As in the previous case, the scrambling and descrambling operations can then be replaced with encryption and decryption operations performed by an encryption module and a decryption module replacing the scrambler 62 and the descrambler 12 respectively. The ECM 7 is then also replaced with any message specific to the data protection system concerned, such as a message of a key establishment or key exchange protocol. In this case, the command 8 is incorporated into this message.

The multimedia temporal content can finally be provided by the system 2B, unprotected. As in the previous cases, the message ECM 7 can then also be replaced with any message from any communication protocol available between the terminal identification device 5 or the network head 6 and the terminal 1. The command 8 is then incorporated into one of these messages.

The multimedia temporal content can also be acquired by the terminal receiving on-the-fly when it is transmitted by any mechanical media player of multimedia temporal content, such as, for example, a digital audio or video disc player, or playing a recording medium after previously having been recorded thereon.

Figure 3:
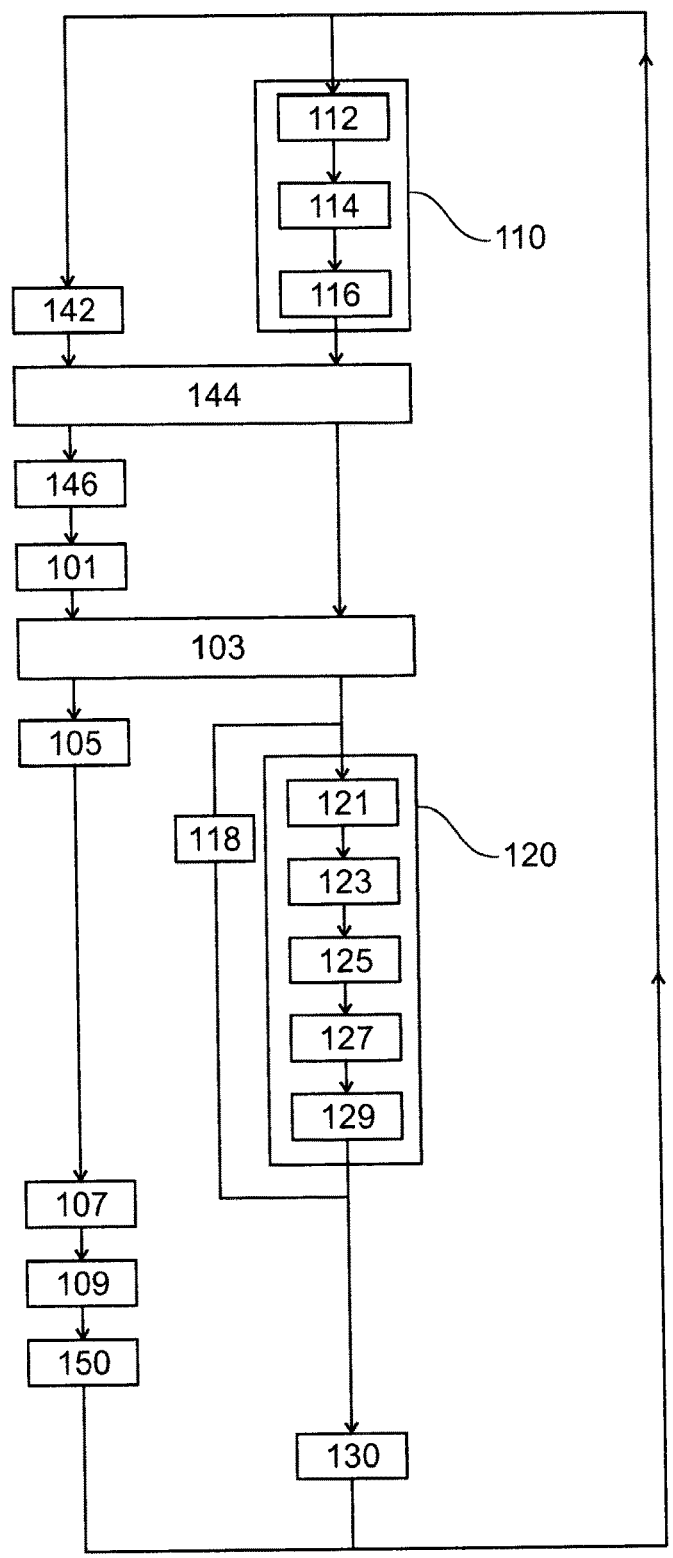
FIG. 3 is a schematic representation of a terminal identification method in a system for providing multimedia content.

During step 101 of the method shown in FIG. 3, the acquisition module 10 of the terminal 1 can then acquire the synchronized multimedia content receiving on-the-fly when it is transmitted by the player 19 or by playing from the memory 18 after previously having been recorded therein. In the last two cases, the times of occurrence, in the multimedia stream resulting from the playing of this content, of the identification commands 8 must then be known to the terminal identification device 5. They can then be provided to it, for example, in any of the formats furthermore described in the document for the first case, following the configuration of the content with a view to its recording.

The memory 18, shown here as inside the terminal 1, can also be any external recording medium connected to the terminal 1.

The multimedia apparatus 2 may also be any device capable of playing the multimedia stream in unscrambled form. The link between the terminal 1 and the multimedia apparatus 2 may be in any other format available for this purpose, such as DVI (Digital Visual Interface), DisplayPort, or IEEE1394 "FireWire".

The multimedia stream modification module 15 may also be activatable only by the decoder 13 or by the composer 14. Rather than being independent, as shown in FIG. 3, it may also be built into the decoder 13 and/or the composer 14. In an intermediate manner, this integration may only be partial, for example involving only some of the functions of the module 15.

The camera 32 may be any recording device capable of recording the multimedia stream in unscrambled form as played by the multimedia apparatus 2 in order to generate a redistributable multimedia stream in unscrambled form.

As a variant, the input of the redistribution server 34 is connected directly to the output of the terminal 1. It may thus directly obtain the multimedia stream in unscrambled form capable of being played by the multimedia apparatus 2, then transmit it via the network 35 to the plurality of terminals 4.

In one variant, the input of the server 34 is not physically connected to the output of the terminal 1 or of the camera 32. The transmission of the content to the server 34, in step 150, is then preceded by its storage by the terminal 1 or the camera 32 in a memory of the terminal 1 or of the redistribution system 3, or a recording medium connected to the latter.

In another variant, the initial time of counting the delay of the predetermined modification associated with the command 8 can also be calculated by taking into account the propagation time of the multimedia stream from the camera 32 to the device 5. This propagation time is referred to as the "cycle time". For this purpose, prior to the implementation of steps 110, 120 and 130, the cycle time of the system 3 is estimated using known methods. For example, the system 2A transmits a command 8 which triggers the application by each terminal of a predetermined modification with a delay equal to zero. The cycle time of the system 3 is then estimated on the basis of the difference between the reception date of the command 8 transmitted by the synchronizer 1a and the time when this modification is detected in the redistributed multimedia stream.

In another embodiment, the synchronizer 1a of the terminal identification system 2A is built into the terminal identification device 5.

Alternatively, the system 2A does not comprise the synchronizer 1a.

For example, during step 144, the module 63 receives back from the multiplexer 64 an identifier of an image or a segment of a plurality of images of the compressed multimedia content with which the ECM 7 is synchronized. This identifier is transmitted to the terminal identification module 51. The module 51 stores this identifier in relation to the identification command 8.

The identifier may be a sequence number of the image in the multimedia stream concerned from the start of this stream, or the "direct" playing duration separating it from the first image of the stream, which can be calculated on the basis of its sequence number and the frequency of the images of the video component. It may also be a cryptographic signature of this image.

The identifier may also be an identifier of the first sound, belonging to the segment synchronized with the ECM 7, of an audio component of the content. This identifier is typically defined in a manner similar to that of the image above.

During step 130, the module 51 uses this identifier to determine the time when the image or the segment of images transmitted at the same time as the command 8 appears in the redistributed multimedia stream. This time is then used as the initial time of counting the delay of the predetermined modification associated with the command 8. It will be noted that the cycle time of the system 3 is taken into account with this method and does not need to be known individually.

In a second embodiment, the bit group identifier parameter 823 may comprise only the integer i, and may thus identify the group of bits of the identifier of the terminal beginning with its index bit i and comprising all the following bits.

However, any syntax other than that shown in the present embodiment may be given to the parameters 821, 822 and 823.

During step 142, the scrambler 62 may alternatively scramble different components or different groups of components of the compressed multimedia content with different control words. It then transmits these different control words to the access configuration module 63 which then encapsulates each of them during step 144 in a message ECM to which it thus imparts the structure 9. A plurality of messages ECM which are able to encapsulate a plurality of control words are consequently likely to be processed, in a manner known to the person skilled in the art, in subsequent steps 101, 103 and 105.

During step 144, the access configuration module 63 can encapsulate the identification command 8 in an Entitlement Management Message (EMM) to be transmitted to the terminal 1 by the network head 6, or in any other message to be transmitted to the terminal 1 by the network head 6, in a manner synchronized or otherwise with the scrambled multimedia content.

During operation 112, the list 82 of parameters constructed by the terminal identification module 51 may not comprise a limit parameter 822. In this case, operation 125 is omitted. The list 82 may also be empty; in this latter case, the constructed identification command 8 may not comprise a list 82 of parameters. This is, for example, possible if strategy 1) previously described is implemented in the system 2B.

During operation 114, the precondition 81 constructed by the terminal identification module 51 may comprise a criterion testing the storage in the terminal 1 of any data specific to the conditional access system.

During operation 114, the precondition 81 constructed by the terminal identification module 51 may be empty. In this case, operation 114 of the method shown in FIG. 3 can be omitted. In this latter case, the constructed identification command 8 may not comprise a precondition 81. For example, when strategy 2) is used independently from strategy 1), the precondition 81 can be omitted.

During step 116, the terminal identification module 51 can transmit the identification command 8 directly to the terminal 1, without using the network head 6, via any network over which the terminal identification device 5 and the terminal 1 can communicate. For example, if the terminal 1 receives the multimedia stream synchronized via a one-way satellite network, the device 5 can use the Internet network to transmit the identification command to the terminal 1.

During step 120, if the identification command 8 does not comprise a precondition 81, operation 121 is omitted. For example, during operation 121, if the identification command 8 comprises an empty precondition 81, the latter is interpreted as satisfied by the identifier of any terminal 1. Similarly, if it does not comprise a list 82 of parameters, operations 123, 125, 127 and 129 are omitted.

During operation 123, any other method of calculating a trigger delay according to the value R of the delay parameter 821 and the value of the group of bits identified by the bit group identifier parameter 823 can be implemented. This may, for example, involve the quotient of the value R and the value of the group of bits. During step 130, said value of the group of bits identified by the parameter 823 is then calculated as the quotient of the value of the parameter 821 and the determined delay of the predetermined modification.

During operation 123, any other value of the group of bits identified by the bit group identifier parameter 823 can be considered. This may notably involve a total number, for example the number of bits of the identified group of bits which have a given value. In the second embodiment already described, this total number is calculated as the number of the first bits of the identified group of bits which have the same value as its first bit.

The calculated delay is zero or operation 123 is omitted if no value is assigned to at least one of the delay parameter 821 and the bit group identifier parameter 823.

During operation 125, any other method of limiting the trigger delay can be implemented. For example, when the trigger delay is calculated as the quotient of the value R and the value of the identified group of bits, if it is less than the value B of the limit parameter 822, the module 15 assigns this value B to the trigger delay; if not, the previously calculated value of the trigger delay is left unchanged.

Operation 125 is omitted if no value is assigned to the limit parameter 822.

The variants described above of operations 123 and 125 of calculating and limiting a trigger delay apply also to operation 127 as far as the calculation and limitation of a playing duration are concerned.

During operation 129, the performed predetermined modification of the multimedia stream can be limited to the bits describing only a part of the complete image concerned. The part concerned of the complete image is, for example, a rectangle covering a sufficient fraction so that the subsequent detection is quite simple. A fraction of this type is, for example, greater than one thousandth of the size of the image.

Alternatively, when the multimedia stream includes a plurality of video components, the predetermined modification can be limited to the bits describing the complete image concerned in only one of the video components of the multimedia stream or in only a part of their whole.

Alternatively, during operation 129, the predetermined modification of at least some of the information bits necessary for playing a sound or displaying a complete image contained in the multimedia stream consists, for example, in the assignment of the value zero to the bits describing a sound, i.e. an audio sample. Alternatively, this predetermined modification consists, for example, in replacing the bits describing the sound or audio sample concerned with those describing the sound or audio sample preceding it in the multimedia stream. Finally, the predetermined modification may consist in replacing the bits describing the sound or audio sample concerned with those describing a third-party sound or audio sample, for example outside the multimedia stream.

Alternatively, when the multimedia stream includes a plurality of audio components, the predetermined modification may be such as that described above, but limited to the bits describing the sound or audio sample concerned in only one of the audio components of the multimedia stream or in only a part of their whole.

Alternatively, during operation 129, the predetermined modification is triggered by the multimedia stream modification module 15 in the conditional access module 11. For example, the module 11 transmits, during step 103, an incorrect control word, i.e. different from the control word encapsulated in the ECM currently being processed, to the descrambler 12. This may, for example, involve the undecrypted cryptogram of the control word as typically encapsulated in the ECM 7, the last control word already transmitted, or an arbitrary fixed value, for example zero. During step 105, the attempt of the descrambler 12 to descramble the scrambled multimedia content using the incorrect control word does not allow it to restore the compressed multimedia content in unscrambled form. The decoder 13 in turn fails, during step 105, to decompress the resulting incorrect multimedia content. In response, the decoder 13 itself performs the predetermined modification of this content. In this embodiment, the decoder 13 is programmed to perform the predetermined modification, such as those already described, if the decoding fails. The continuation of the method is then identical to that already described.

Alternatively, during step 109, the terminal 1 transmits this modified multimedia stream directly to the redistribution server 34 when the input of the latter is connected directly to the output of the terminal 1. The playing by the multimedia apparatus 2 of the modified multimedia stream in unscrambled form, or the actual integration of this multimedia apparatus 2 into the multimedia content providing system 2B, and also the integration of the camera 32 into the multimedia stream redistribution system 3 can then be omitted.

During step 130, the redistributed multimedia stream acquisition module 53, after having acquired it, stores the redistributed multimedia stream in a memory of the terminal identification device 5 or in a recording medium connected to the latter. The determination by the module 51 of the identifier of the terminal 1 can then be performed later on the basis of the recorded multimedia stream.

Alternatively, during step 130, the terminal identification module 51 determines the delay of the predetermined modification as the playing duration of the audio samples separating the first audio sample of the segment concerned of the redistributed multimedia stream and the first audio sample of this stream carrying the predetermined modification, i.e. the quotient of the number of these audio samples and their frequency.

During this step 130, the module 51 can also determine the delay of the predetermined modification using a time reference outside the redistributed multimedia stream, such as, for example, a clock inside the device 5.

Alternatively, during step 130, if the identification command 8 comprises a list 82 of non-empty parameters in which the trigger delay parameter 821 and the bit group identifier parameter 823 have been given values, the terminal identification module 51 determines a playing duration as the duration, in the redistributed multimedia stream, separating the start and end of the occurrence of the predetermined modification in this stream. For example, the module 51 determines this duration as the quotient of the number of successive images having undergone the predetermined modification and the playing frequency of these images. This playing duration is then used instead of the delay of the predetermined modification in order to determine a value of the group of bits identified by the parameter 823.

The invention claimed is:

1. In a system that delivers multimedia content and that comprises a terminal and a multimedia apparatus connected to each other, wherein said terminal acquires and then decodes multimedia temporal content thereby generating an unscrambled multimedia stream, wherein said unscrambled multimedia stream is transmitted during a temporal succession of time intervals, wherein each time interval corresponds to data selected from the group consisting of data representing a single image and data representing a single sound, wherein said temporal succession of time intervals is clocked at a predefined frequency, wherein a set of information bits is transmitted during one of said time intervals, wherein said set of information bits is necessary for an operation selected from the group consisting of displaying a single complete image on said multimedia apparatus and playing a sound on said multimedia apparatus, and wherein said multimedia stream is playable by said multimedia apparatus, a method comprising participating in a system that delivers multimedia content, wherein participating in said system comprises executing a step selected from the group consisting of generating a modified multimedia-stream at said terminal, and determining an identifier that identifies an element selected from the group consisting of said terminal and a group of terminals to which said terminal belongs, wherein generating said modified multimedia-stream comprises acquiring and decoding multimedia temporal content in order to generate a multimedia stream in unscrambled form, wherein said unscrambled multimedia stream is transmitted during a temporal succession of time intervals, wherein said temporal succession of time intervals is clocked at a predefined frequency, wherein a set of information bits is transmitted during a time interval from said succession of time intervals, wherein said set of information bits is necessary for an operation selected from the group consisting of displaying a single complete image on said multimedia apparatus and playing a sound on said multimedia apparatus, wherein each time interval from said temporal succession of time intervals corresponds to data selected from the group consisting of data representing a single image and data representing a single sound, and wherein said multimedia stream is playable by said multimedia apparatus, receiving an identification command transmitted by a terminal-identification device, in response to said identification command, causing destruction of information in said multimedia stream, wherein causing destruction of information in said multimedia stream comprises triggering a predetermined modification of at least some of said information bits, thereby generating a modified multimedia-stream, wherein, as a result of having destroyed said information, original values of said information bits are not present in said modified multimedia-stream, wherein, as a result of having destroyed said information, original values of said information bits cannot be restored so as to recover said multimedia stream, wherein triggering is carried out as a function of an identifier, wherein said identifier identifies one of said terminal and a terminal group to which said terminal belongs, wherein said modification comprises content that is independent of said identifier, and transmitting said modified multimedia-stream as a multimedia stream to be played by said multimedia apparatus; and wherein determining said identifier comprises causing a terminal-identification device to transmit an identification command to said terminal, acquiring, at said terminal-identification device, a modified multimedia-stream, said modified multimedia-stream having been formed by said terminal in response to said identification command, and causing said terminal-identification device to determine said identifier based on said transmitted command and on an extent to which a predetermined modification is present in said modified multimedia-stream, and wherein determining said identifier is carried out independently of content of said predetermined modification.

2. The method of claim 1, further comprising selecting said step to be that of generating a modified multimedia-stream at said terminal.

3. The method of claim 2, wherein generating said modified multimedia-stream comprises providing said terminal with a composer that receives decompressed components of said multimedia stream, combines said decompressed components to make up said multimedia stream, and transmits said multimedia stream on an output thereof, and wherein triggering a predetermined modification of at least some of said information bits comprises, in response to said identification command, having said composer trigger or perform said predetermined modification in such a way as to form said modified multimedia-stream.

4. The method of claim 2, wherein, when generating said modified multimedia-stream, receiving an identification command comprises receiving a command having a precondition that tests for presence of a value of a prerecorded parameter within said terminal, said precondition being constructed in such a way as to be verified only by some terminals to which said identification command is transmitted, and wherein said terminal triggers said predetermined modification according to a result of having evaluated said precondition.

5. The method of claim 4, wherein receiving a command having a precondition further comprises receiving an index criterion comprising a value parameter, said index criterion being true if a bit of said identifier of said terminal having an index given by said value parameter has a predetermined value.

6. The method of claim 4, wherein receiving a command having a precondition further comprises receiving an identifier criterion comprising a value parameter and a mask parameter, said identifier criterion being true if terminal identifier bits selected or masked by said mask parameter have values that are equal to those of said value parameter.

7. The method of claim 4, wherein receiving a command having a precondition further comprises receiving an identifier criterion comprising a mask parameter and a total number parameter, said identifier criterion being true if a number of terminal identifier bits selected or masked by said mask parameter that have a predetermined value is equal to said total number parameter.

8. The method of claim 4, wherein receiving a command having a precondition further comprises receiving an event criterion comprising a list of event identifiers, said event criterion being true if each of said event identifiers on said list is stored in said terminal.

9. The method of claim 4, wherein receiving a command having a precondition further comprises receiving an event criterion comprising a list of event identifiers, said event criterion being true if each of said event identifiers on said list is not stored in said terminal.

10. The method of claim 4, wherein receiving a command having a precondition further comprises receiving an entitlement criterion comprising a list of entitlement identifiers, said entitlement criterion being true if each of said entitlement identifiers on said list is stored in said terminal.

11. The method of claim 4, wherein receiving a command having a precondition further comprises receiving an entitlement criterion comprising a list of entitlement identifiers, said entitlement criterion being true if each of said entitlement identifiers on said list is not stored in said terminal.

12. The method of claim 4, wherein receiving a command having a precondition further comprises receiving an operating-time criterion comprising a duration parameter, said operating-time criterion being true if said terminal has been in operation for a duration greater than that expressed by said duration parameter.

13. The method of claim 4, wherein receiving a command having a precondition further comprises receiving an operating-time criterion comprising a duration parameter, said operating-time criterion being true if said terminal has been in operation for a duration less than that expressed by said duration parameter.

14. The method of claim 4, wherein receiving a command having a precondition further comprises receiving an operating-period criterion comprising a list of associations of time intervals with a channel, said operating-period criterion being true if, for each of said associations, said terminal has been in operation on said channel during each of said time intervals.

15. The method of claim 4, wherein receiving a command having a precondition further comprises receiving an operating-period criterion comprising a list of associations of time intervals with a channel, said operating-period criterion being true if, for each of said associations, said terminal has not been in operation on said channel during each of said time intervals.

16. The method of claim 2, wherein, when generating said modified multimedia-stream, triggering a predetermined modification of at least some of said information bits, thereby generating a modified multimedia-stream comprises calculating, according to said identifier, a duration of a time interval between a time at which said terminal receives said identification command and a time at which said terminal is to trigger said predetermined modification and triggering said predetermined modification upon lapse of said time interval.

17. The method of claim 16, wherein receiving an identification command transmitted by a terminal-identification device comprises receiving a delay parameter, a limit parameter and a bit-group parameter, and wherein triggering a predetermined modification comprises calculating said duration based at least in part on said delay parameter and on a value of a bit group of said identifier, said bit group having been identified by said bit-group parameter, and determining that said calculated duration exceeds said duration determined according to said limit parameter, and, in response to said determination, limiting said calculated duration to said duration determined according to said limit parameter.

18. The method of claim 16, wherein receiving an identification command transmitted by a terminal-identification device comprises receiving a delay parameter, a limit parameter and a bit-group parameter, and wherein triggering a predetermined modification comprises calculating said duration based at least in part on said delay parameter and on a value of a bit group of said identifier, said bit group having been identified by said bit-group parameter, and determining that said calculated duration is less than a duration determined according to said limit parameter, and, in response to said determination, leaving said calculated duration unchanged.

19. The method of claim 16, wherein triggering a predetermined modification of at least some of said information bits comprises determining a playing duration according to said identifier, and controlling said triggering in such way as to ensure that a playing duration of said sounds or complete images thus modified is equal to said calculated playing duration.

20. The method of claim 1, further comprising selecting said step to be that of determining an identifier that identifies an element selected from the group consisting of a terminal and a group of terminals to which said terminal belongs.

21. The method of claim 20, wherein determining said identifier comprises constructing a precondition and inserting said precondition into said identification command to be transmitted, wherein said precondition tests for presence of at least one prerecorded parameter in a terminal, said precondition being constructed in such a way as to be verified only by some terminals to which said identification command is transmitted.

22. The method of claim 20, wherein determining said identifier comprises constructing a precondition and inserting said precondition into said identification command to be transmitted, wherein said precondition tests for a value of at least one prerecorded parameter in said terminal, said precondition being constructed in such a way as to be verified only by some terminals to which said identification command is transmitted.

23. The method of claim 20, wherein transmitting an identification command comprises transmitting said identification command to said terminal in one of an entitlement control message and an entitlement management message of a conditional-access system provided and synchronized with said protected temporal content.

24. A manufacturing comprising a tangible and non-transitory computer-readable medium having encoded thereon instructions for carrying out a method of claim 1 when said instructions are executed by an electronic processor.

25. An apparatus comprising a terminal that has been specifically designed for carrying out the method recited in claim 2.

26. An apparatus comprising a terminal-identification device that has been specifically designed for carrying out the method recited in claim 20.

* * * * *